United States Patent
Lee et al.

(10) Patent No.: US 12,488,821 B2
(45) Date of Patent: Dec. 2, 2025

(54) SEMICONDUCTOR DEVICE INCLUDING REFERENCE CELLS AND A METHOD OF OPERATING THEREOF

(71) Applicant: Taiwan Semiconductor Manufacturing Company, Ltd., Hsinchu (TW)

(72) Inventors: Po-Hao Lee, Hsinchu (TW); Yi-Chun Shih, Taipei (TW); Chia-Fu Lee, Hsinchu (TW); Yu-Der Chih, Hsin-Chu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 333 days.

(21) Appl. No.: 18/169,560

(22) Filed: Feb. 15, 2023

(65) Prior Publication Data
US 2023/0352071 A1 Nov. 2, 2023

Related U.S. Application Data

(60) Provisional application No. 63/410,420, filed on Sep. 27, 2022, provisional application No. 63/337,452, filed on May 2, 2022.

(51) Int. Cl.
G11C 11/00 (2006.01)
G11C 11/16 (2006.01)

(52) U.S. Cl.
CPC ...... *G11C 11/1673* (2013.01); *G11C 11/1659* (2013.01)

(58) Field of Classification Search
CPC ............... G11C 11/1673; G11C 11/1659
See application file for complete search history.

(56) References Cited

U.S. PATENT DOCUMENTS

| 7,885,102 | B2 * | 2/2011 | Hanzawa | G11C 13/0004 |
| | | | | 365/163 |
| 9,202,561 | B1 * | 12/2015 | Park | G11C 7/14 |
| 9,734,883 | B1 | 8/2017 | Yu et al. | |
| 11,348,638 | B2 * | 5/2022 | Lin | G11C 7/065 |
| 2017/0316833 | A1 | 11/2017 | Ihm et al. | |

FOREIGN PATENT DOCUMENTS

TW 201822198 A 6/2018

OTHER PUBLICATIONS

Office Action issued in connection with Taiwan Appl. No. 112115778 dated Dec. 27, 2023.

* cited by examiner

*Primary Examiner* — Pho M Luu
(74) *Attorney, Agent, or Firm* — FOLEY & LARDNER LLP

(57) ABSTRACT

A semiconductor device includes a plurality of memory cells, a first reference cell connected to a first subset of the plurality of memory storage cells via a first common source line, and a second reference cell connected to a second subset of the plurality of memory storage cells via a second common source line. The semiconductor device also includes a sense amplifier configured to, when reading from a first memory cell of the first subset, receive an output from the second reference cell and an output from the first memory cell.

20 Claims, 9 Drawing Sheets

SEMICONDUCTOR DEVICE INCLUDING REFERENCE CELLS AND A METHOD OF OPERATING THEREOF

CROSS-REFERENCE TO RELATED APPLICATIONS

The present application claims priority to and the benefit of U.S. Patent App. No. 63/337,452, filed May 2, 2022, and U.S. Patent App. No. 63/410,420, filed Sep. 27, 2022, the entire disclosures of which are incorporated herein by reference.

BACKGROUND

A magnetic random access memory (MRAM) offers comparable performance to volatile static random access memory (SRAM) and comparable density with lower power consumption to volatile dynamic random access memory (DRAM). Compared to non-volatile memory (NVM) flash memory, an MRAM offers much faster access times and suffers minimal degradation over time, whereas a flash memory can only be rewritten a limited number of times. An MRAM cell is formed by a magnetic tunneling junction (MTJ) comprising two ferromagnetic layers that are separated by a thin insulating barrier, and operates by tunneling of electrons between the two ferromagnetic layers through the insulating barrier.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
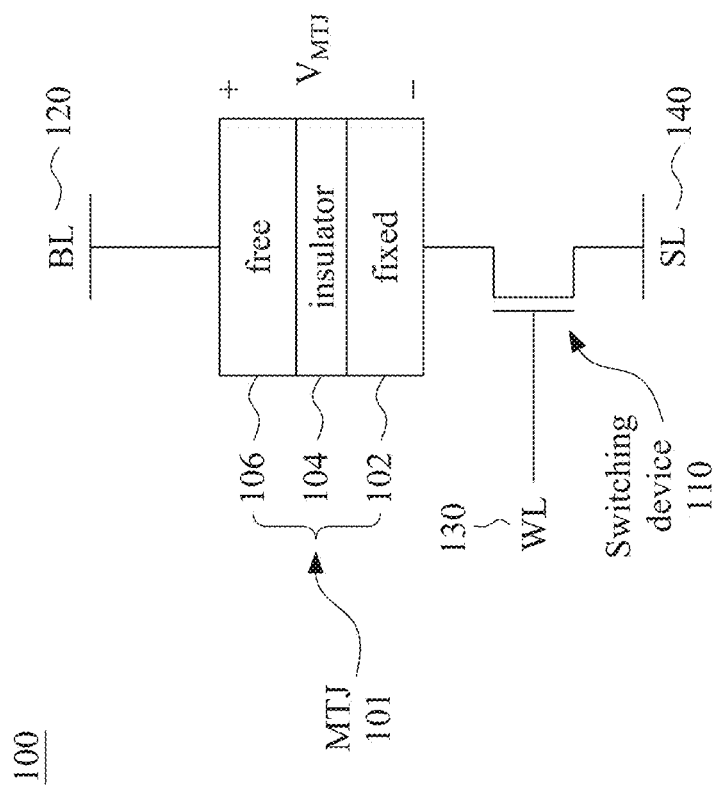
FIG. 1 shows a memory cell of an MRAM device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

MRAM arrays include memory cells that can be written with a logic "0" or a logic "1" which is dependent on the magnetization of the free layer. When the free layer has a magnetization that is parallel to fixed or pinned layer, the resistance is low, and a high current can flow. When the free layer has a magnetization that is anti-parallel to the fixed layer, the resistance is high, and a low current can flow. The amount of current is compared to a reference current to determine whether the logic state is "0" or "1."

MRAM arrays may use a global reference cell, which uses one reference cell for comparison for the whole array, or a local reference cell, which is included in each row of MRAM cells. Typically in local reference arrays, a row of MRAM cells (e.g., MRAM cells that share a word line or MRAM cells that share one input/output pin) includes the reference cell and a plurality of MRAM cells. The MRAM cells and the reference cell can all share a common sense line (or a common source line). However, when the MRAM cells all have a logic "0" or a logic "1," a voltage level of the common source line can change. This can cause variations in the current flowing through the reference cell. For example, when the row of MRAM cells all have a logic "0," the current flowing through the reference cell may be several micro-amps (μA) less than when the row of MRAM cells all have a logic "1." The variations can cause a reduction in a read window of the MRAM cell. A reduction in the read window reduces the speed of the MRAM read operation, and accordingly, there is a need to increase the read window.

In the present disclosure, a novel design of an MRAM array can provide several advantages over the current technology. A row of MRAM cells that share the same word line are broken into two groups, each group sharing a source line with a reference cell. When reading an MRAM cell from one group, the reference cell in the other group is activated. The MRAM cells are connected to one multiplexer and the reference cells are connected to another multiplexer for selecting the appropriate memory cell and reference cell. Because the source lines are not shared between the activated MRAM cell and the activated reference cell, the reference cell's source line's voltage is not affected by the MRAM cell's current. Accordingly, the read window may advantageously be higher than conventional systems.

FIG. 1 shows a memory cell 100 of an MRAM device, in accordance with some embodiments. The memory cell includes a magnetic memory element such as a MTJ device 101 and a switching device 110. In this disclosure, the MTJ device 101 may also be called a memory cell. MTJ device 101 includes a fixed layer 102, a tunneling barrier layer or an insulator layer 104, and a free layer 106. The magnetization of the free layer 106 is free to rotate to point in one of two directions. For the fixed layer 102, an anti-ferromagnetic layer may be used to fix, or pin, its magnetization in a particular direction. The insulator layer 104 is sandwiched between the free layer 106 and the fixed layer 102. The free layer 106 is connected to a bit line (BL) 120 which provides the free layer with a voltage in a read or write operation. The fixed layer 102 is connected to the drain of the switching device 110.

The switching device 110 is used to read from, or write to the MTJ device 101. Embodiments of the switching device 110 include a metal oxide semiconductor (MOS) transistor, an MOS diode, and/or a bipolar transistor. The gate of the switching device 110 is connected to a word line (WL) 130, which may activate the memory cell for a read or write operation. In some embodiments, the WL 130 may include a read WL and a write WL, where the read WL is activated for a read operation and the write WL is activated for a write operation. The source of the switching device 110 is connected to a source line (SL) 140, which may drive the fixed layer 102 with a voltage in a read or write operation when activated by the WL 130. The SL 140 may include a common source line (CSL) which may be connected to a plurality of memory cells 100 that are connected to the same WL 130. A controller (not shown) may provide a turn-on voltage (e.g., Vcc) to the WL 130.

Data in the MTJ device 101 is represented by the magnetization direction of the free layer 106 relative to the fixed layer 102. When the magnetization of the free layer 106 and the fixed layer 102 are parallel and the magnetic moments have the same polarity, the resistance of the MTJ device 101 is low, which may be designated as a "0" state. When the magnetization of the free layer 106 and the fixed layer 102 are anti-parallel and the magnetic moments have the opposite polarity, the resistance of the MTJ device 101 is high, which may be designated as a "1" state. During a read operation of the memory cell 100, a current may be flow from the SL 140 to the BL 120. When the resistance of the MTJ device 101 is low (e.g., "0" state), the current may be high. When the resistance of the MTJ device 101 is high (e.g., "1" state), the current may be low.

The current flowing from the BL 120 may be provided to a sense amplifier that can compare the current to a reference current from a reference cell. The reference cell may have a resistance that is an average of the two different states of the MTJ device 101. For example, the resistance of a reference cell may be set to the average of a parallel state and an anti-parallel state. The sense amplifier can then compare a current output of the MTJ device 101 against the current output of the reference cell. If the current output of the MTJ device 101 is less than the reference cell, that means the resistance in the MTJ device 101 is high, and a "1" state is read from the MTJ device 101. If the current output of the MTJ device 101 is greater than the reference cell, that means the resistance in the MTJ device 101 is low, and a "0" state is read from the MTJ device 101.

Figure 2:
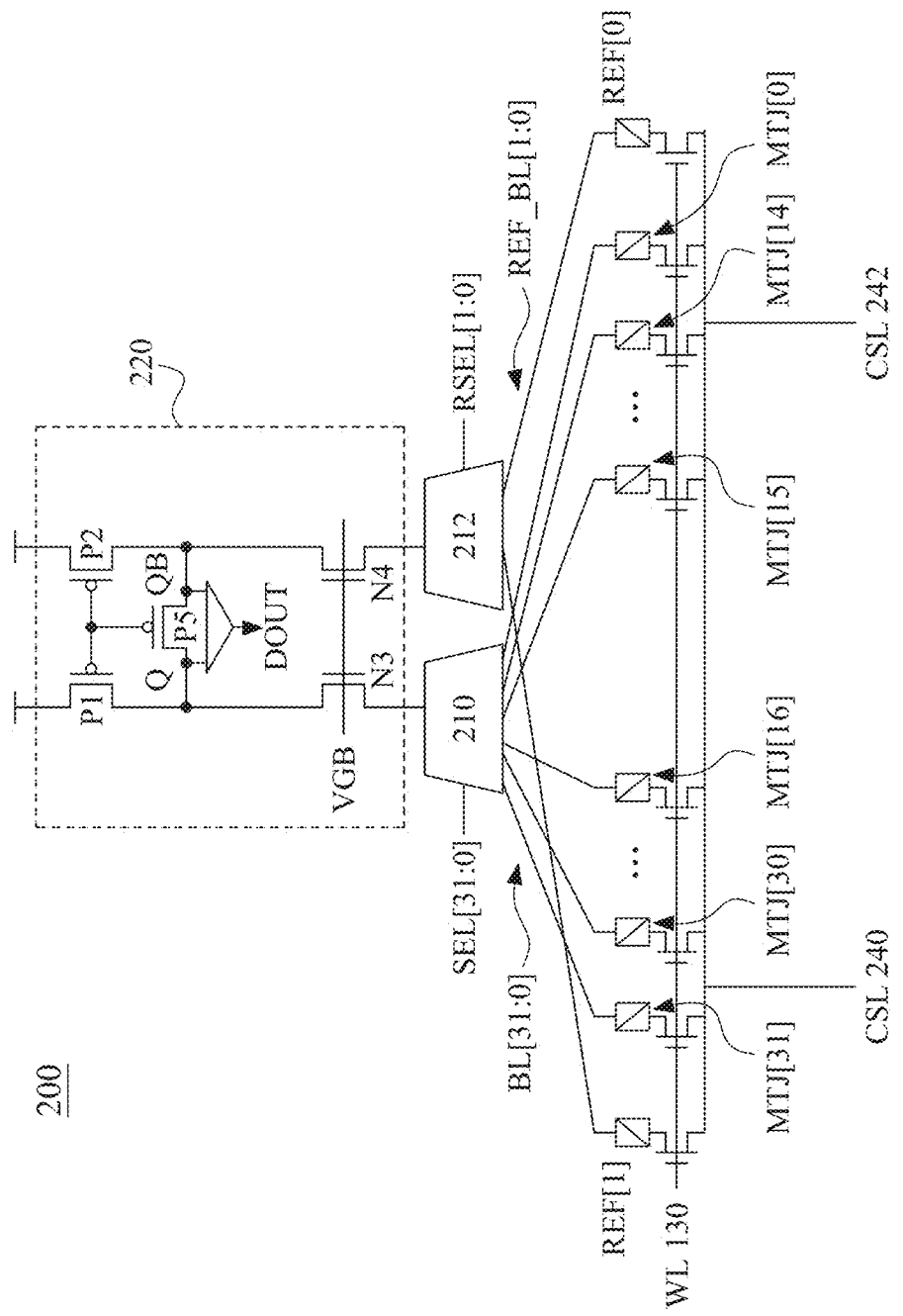
FIG. 2 illustrates a schematic of an example group of memory cells of a memory array, in accordance with some embodiments.

FIG. 2 illustrates a schematic of an example group 200 of memory cells of a memory array, in accordance with some embodiments. The group 200 may include a reference cell REF[1], a plurality of MTJ devices MTJ[31:0], and a reference cell REF[0]. Although 32 MTJ devices (e.g., MTJ device 101) are shown in FIG. 2, embodiments are not limited thereto, and more or fewer MTJ devices may be disposed in a group 200. The group 200 includes multiplexers (MUX), which include a BL MUX 210 and a REF MUX 212. The BL and REF MUXes 210 and 212 are connected to a sense amplifier 220 which may provide an output at node DOUT. Each of the MTJ devices MTJ[31:0] is connected to a switching device (e.g., switching device 110) which is controlled by the WL 130.

The group 200 may be connected to one input/output (I/O) pin or pad. For example, the outputs of all of the memory cells in the group 200 may be read by the same I/O pad.

As discussed above, the reference cells REF[1] and REF[0] may include a reference resistance that is an average of a an MTJ device 101 having a parallel magnetization and an MTJ device 101 having an anti-parallel magnetization. Accordingly, a reference current may flow through each of the reference cells REF[1] and REF[0] which may be used by the sense amplifier 220. When reading from a memory cell, e.g., memory cell including the MTJ device MTJ[31], the WL 130 may be activated (e.g., provided with a turn-on voltage such as Vcc).

Each of the CSL 240 and CSL 242 is connected to a reference cell and a group of memory cells. For example, the CSL 240 may be connected to the reference cell REF[1] and the MTJ devices MTJ[31:16], and the CSL 242 may be connected to the reference cell REF[0] and the MTJ devices MTJ[15:0]. Both the CSL 240 and the CSL 242 may be connected to a ground node (e.g., 0V). The MTJ devices MTJ[31:16] may be referred to as a first subset, and the MTJ devices MTJ[15:0] may be referred to as a second subset.

The BL MUX 210 may be connected to all of the memory cells including the MTJ devices MTJ[31:0]. The BL MUX 210 may be used to receive the output currents from each of the MTJ devices MTJ[31:0] as inputs and output one of the output currents. The output current that is provided at the output of the BL MUX 210 may include the output current of the memory cell that is being read during the read operation. For selecting one of the output currents, a selector SEL[31:0] may be used which can be configured in any number of ways. For example, the selector SEL[31:0] may be a one-hot configuration (e.g., 32 selector lines, one of which is turned on), a binary configuration (e.g., using 5 selector lines), etc. If the user is trying to read from the memory cell including, e.g., the MTJ device MTJ[31], the selector SEL[31:0] may be configured to select the memory cell with the MTJ device MTJ[31]. Then the output of the BL MUX 210 may include the current from the MTJ device MTJ[31]. The controller (not shown) may be provide signals to the SEL[31:0] and/or the REF[1:0] to select the appropriate memory cell and the reference cell.

The REF MUX 212 may be connected to the reference cells REF[1:0]. The REF MUX 212 may be used to receive the output currents from each of the reference cells REF[1:0] as inputs and output one of the output currents. The output current that is provided at the output of the REF MUX 212 may include the output current of the reference cell REF[1:0] that is being used to compare the selected memory cell's output current read during the read operation.

The output currents from the MTJ devices MTJ[31:0] may be provided to the bit lines BL[31:0], respectively. The bit lines BL[31:0] may be provided as inputs to the BL MUX 210. The output currents from the reference cells REF[1:0]

may be provided to reference bit lines REF_BL[1:0], respectively. The reference bit lines REF_BL[1:0] may be provided as inputs to the REF MUX 212.

When reading from one of the memory cells, the reference cell that is not connected to the selected memory cell may be selected for comparison. For example, when reading from a memory cell of the first subset of memory cells (e.g., MTJ[31:16]), the reference cell REF[0] may be selected for comparison. And when reading from a memory cell of the second subset of memory cells (e.g., MTJ[15:0]), the reference cell REF[1] may be selected for comparison.

When the reference cell connected to a subset of memory cells not being read is used, both source lines CSL 240 and 242 are used. For example, when reading from memory cell including the MTJ device MTJ[31], a current flows through the MTJ device MTJ[31] and into the CSL 240. Similarly, a current also flows through the reference cell REF[0] and into the CSL 242. Because the currents flowing through the MTJ device MTJ[31] and the reference cell REF[0] are separated, the currents do not influence each other. Accordingly, the read window may not be negatively affected by variations in the source line voltage.

The sense amplifier 220 may receive the outputs of the BL MUX 210 and the REF MUX 212 and compare the outputs. The sense amplifier 220 may provide the comparison to the node DOUT. Although the sense amplifier 220 includes a certain configuration, embodiments are not limited thereto, and a variety of other sense amplifier designs may be used.

Figure 3:
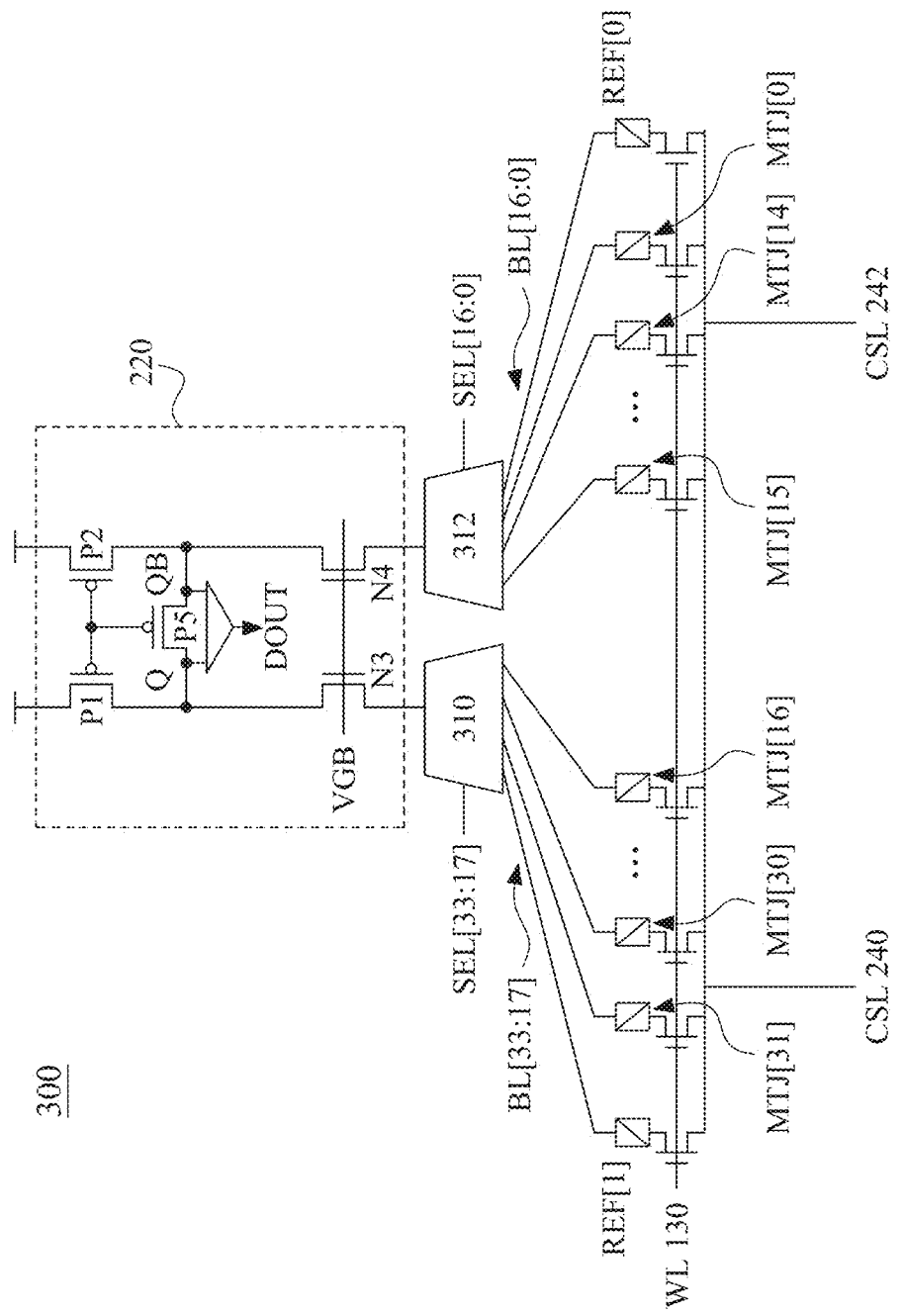
FIG. 3 illustrates a schematic of an example group of memory cells of a memory array, in accordance with some embodiments.

FIG. 3 illustrates a schematic of an example group 300 of memory cells of a memory array, in accordance with some embodiments. The example group 300 is similar to the example group 200 of FIG. 2 except for the following differences. The reference cells REF[1] and the MTJ devices MTJ[31:16] may provide outputs via bit lines BL[33:17] to the first MUX 310 as inputs. The first MUX 310 may receive a selector SEL[33:17] that may be used to select which of the inputs of the first MUX 310 to select. Similarly, the MTJ devices MTJ[15:0] and reference cell REF[0] may be provided via bit lines BL[16:0] to a second MUX 312 as inputs. The second MUX 312 may receive a selector SEL[16:0] that may be used to select which of the inputs of the second MUX 312 to select.

With this arrangement, the layout of the group 300 may be more simplified. Rather than having a large BL MUX 210 with 32 inputs and selector bits and a small REF MUX 212 with 2 inputs and 1 selector bit as shown in FIG. 2, the FIG. 3 embodiment can provide a more uniform size for the muxes and selector signals because both the MUXes 310 and 312 receive 17 inputs and 17 selector bits.

The group 300 of memory cells may be operated similarly to the group 200 of FIG. 2. For example, when any of the memory cells including the MTJ devices MTJ [31:16] is being read, the reference cell REF [0] may be selected for comparison. The current output of the selected memory cell may be output from the first MUX 310 to the left input line (or bit line) of the sense amplifier 220. The current output of the reference cell REF [0] may be output from the second MUX 312 to the right input line (or bit line) of the sense amplifier 220. Similarly, when any of the memory cells including the MTJ devices MTJ [15:0] is being read, the reference cell REF [1] may be selected for comparison.

Because the output of the reference cells REF[1] or REF[0] may be swapped (e.g., left side or right side of the sense amplifier), the controller that receives the output of the sense amplifier 220 may invert the polarity of the output DOUT so that the proper output is read. For example, the reference cell REF[1] is provided (when reading from the MTJ devices MTJ[15:0]), the polarity of the provided DOUT may be maintained. But when the reference cell REF[0] is provided (when reading from the MTJ devices MTJ[31:16]), the polarity of the provided DOUT may be flipped. This may be done for the sake of consistency in interpreting whether a logic "0" or a logic "1" is written into the selected memory cell.

Figure 4:
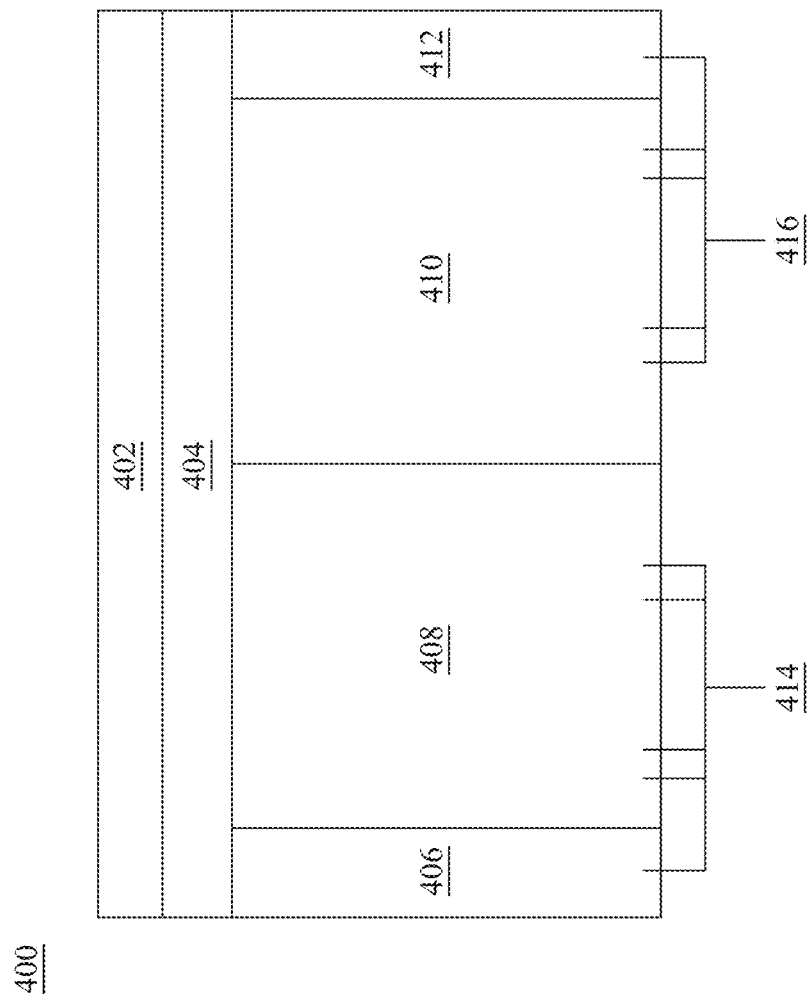
FIG. 4 illustrates a block diagram of an example layout of the example group of FIG. 3, in accordance with some embodiments.

FIG. 4 illustrates a block diagram of an example layout 400 of the group 300, in accordance with some embodiments. The layout 400 shows a sense amplifier 402 (e.g., sense amplifier 220), a MUX layer 404 (e.g., MUXes 210, 212 or MUXes 310, 312), first reference cell 406 (e.g., first reference cell REF [1]), memory array 408 (e.g., memory array including memory cells including MTJ devices MTJ [31:16]), memory array 410 (e.g., memory array including memory cells including MTJ devices MTJ [15:0]), and second reference cell 412 (e.g., second reference cell REF [0]). The first reference cell 406 and memory array 408 may be connected to a common sense line 414 (e.g., CSL 240), and the memory array 410 and the second reference cell 412 may be connected to a common sense line 416 (e.g., CSL 242).

As shown in FIG. 4, the first reference cell 406, memory arrays 408 and 410, and the second reference cell 412 may be disposed laterally from one another. And then on one side, the MUX layer 404 may be disposed. Although not shown, one or more bit lines (e.g., BL[31:0] and REF_BL[1:0] of FIG. 2 or BL[33:0] of FIG. 3) may be disposed connecting the first reference cell 406, memory arrays 408 and 410, and the second reference cell 412 to one or more MUXes in the mux layer 404. Additionally, one or more output lines from the MUXes in the mux layer 404 may be connected to the sense amplifier 402.

Figure 5:
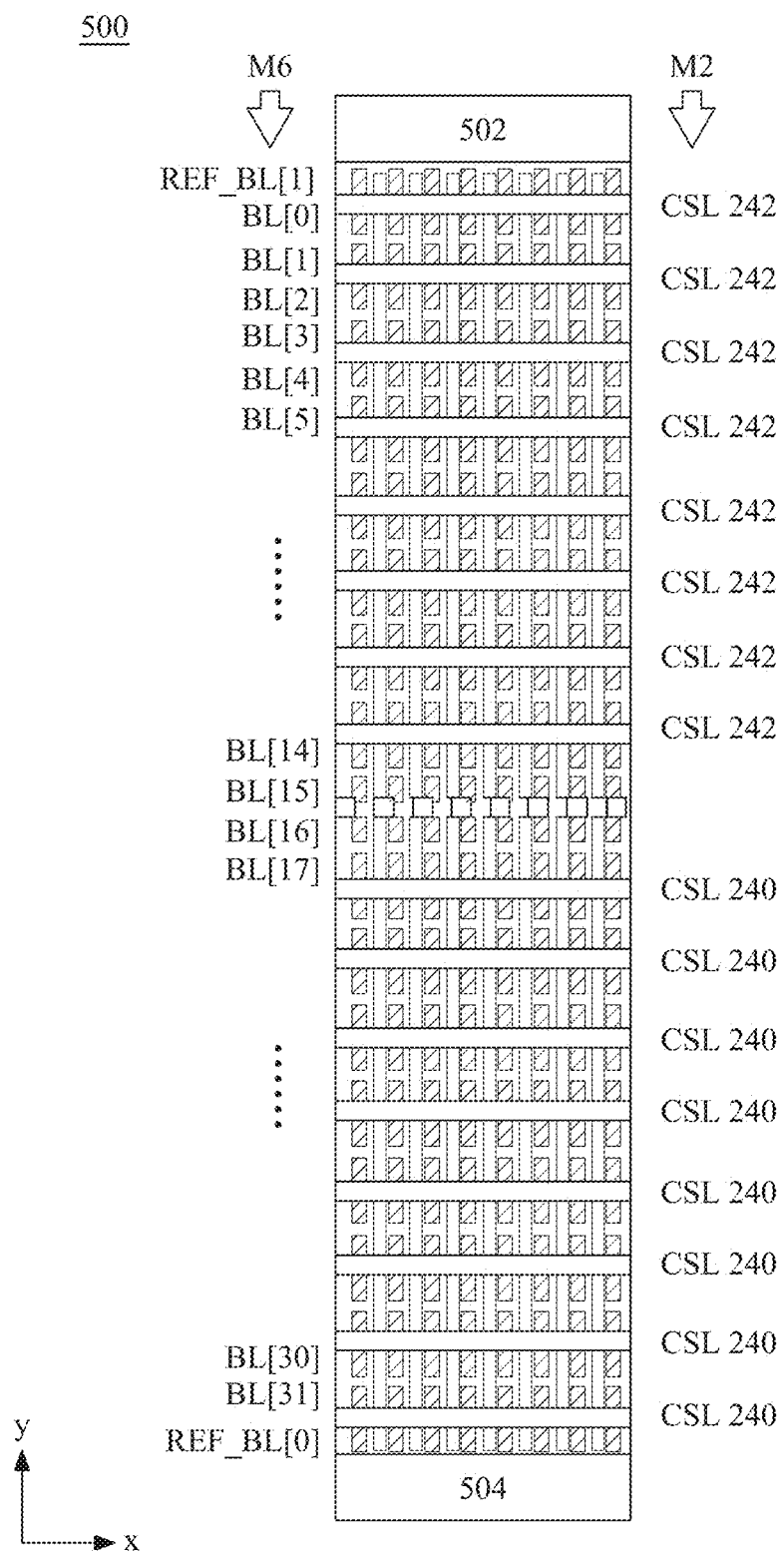
FIG. 5 illustrates an example layout that shows a layout of a semiconductor device, in accordance with some embodiments.

FIG. 5 illustrates an example layout 500 that shows a layout of a semiconductor device, in accordance with some embodiments. The example layout 500 includes a plurality of bit lines BL[31:0], reference bit lines REF_BL[1:0], CSL 240 and 242, and WL stitches 502 and 504. The bit lines BL[31:0] may be similar to the bit lines BL[31:0] of FIG. 2 or BL[32:1] of FIG. 3. The reference bit line REF_BL[1] may be similar to the reference bit line REF_BL[1] of FIG. 2 or bit line BL[33] of FIG. 3. The reference bit line REF_BL[0] may be similar to the reference bit line REF_BL [0] of FIG. 2 or bit line BL[0] of FIG. 3.

The WL stitch 502 and the WL stitch 504 may be disposed on opposing ends of the layout. The WL stitch 502 may include stitching or connections of WLs and metal layers such that the WLs for the reference bit line REF_BL[1] and the bit lines BL[15:0] are connected to the WLs that extend from the WL stitch 502. The WL stitch 504 may include stitching or connections of WLs and metal layers such that the WLs for the reference bit line REF_BL[0] and the bit lines BL[31:16] are connected to the WLs that extend from the WL stitch 504.

The reference bit lines REF_BL[1:0] may be disposed on opposing ends of a row of memory cells (and their corresponding bit lines BL[31:0]). For example, the bit lines BL[31:0] may be disposed in a row in a y-direction. The reference bit line REF_BL[1] may be disposed between the bit line BL[0] and the word stitch 502. The reference bit line REF_BL[0] may be disposed between the bit line BL[1] and the word stitch 504.

Although not shown in FIG. 5, there may be a stacked set of metal layers that function as interconnects and various signal lines. There may be any number of metal layers such as M0, M1, M2 . . . M6, M7, etc., with the metal layer M0 being formed lower than metal layer M7, etc. In some embodiments, the reference bit lines REF_BL[1:0] and the bit lines BL[31:0] may be formed in a metal layer such as metal layer M6, and the CSL 240 and 242 may be formed in a metal layer such as metal layer M2. However, embodiments are not limited thereto, and the reference bit lines REF_BL[1:0], the bit lines BL[31:0], and the CSL 240, 242 may be disposed in different metal layers.

Figure 6:
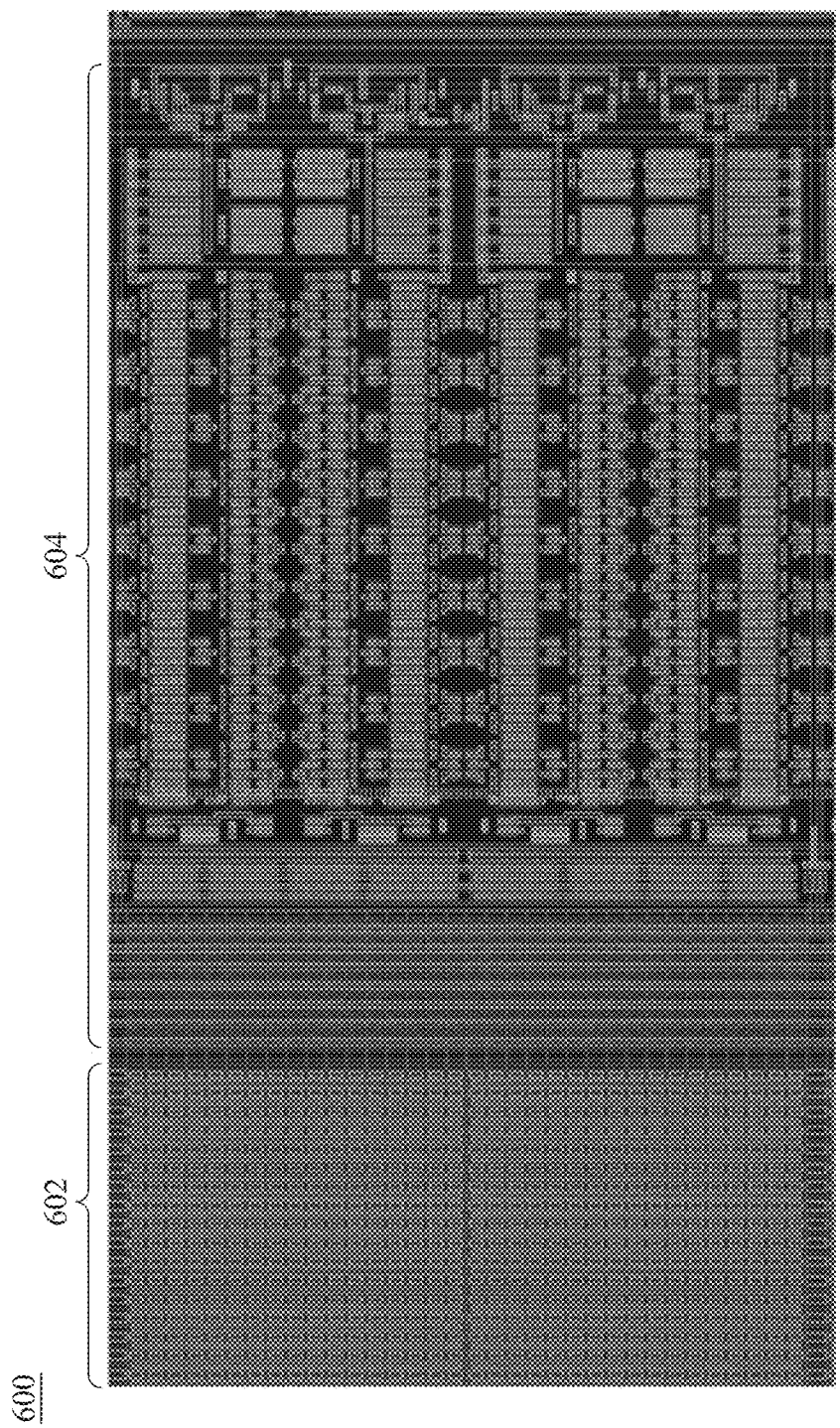
FIG. 6 illustrates an example layout of the WL and a MUX portion, in accordance with some embodiments.

FIG. 6 illustrates an example layout of a portion of the memory group 200 (FIG. 2) or memory group 300 (FIG. 3), in accordance with some embodiments. The portion shown in FIG. 6 includes a WL portion 602 and a MUX portion 604. In some embodiments, the WL portion 602 and MUX portion 604 may be disposed adjacent to each other. The WL portion 602 can include a number of the WL 130 of the memory cells. The MUX portion 604 may include a number of the MUXes as described above (MUXes 210, 212 or MUXes 310, 312). However, it should be noted that respective footprints of the WLs and MUXes can be arranged in any of various other configurations, while remaining within the scope of the present disclosure.

Figure 7:
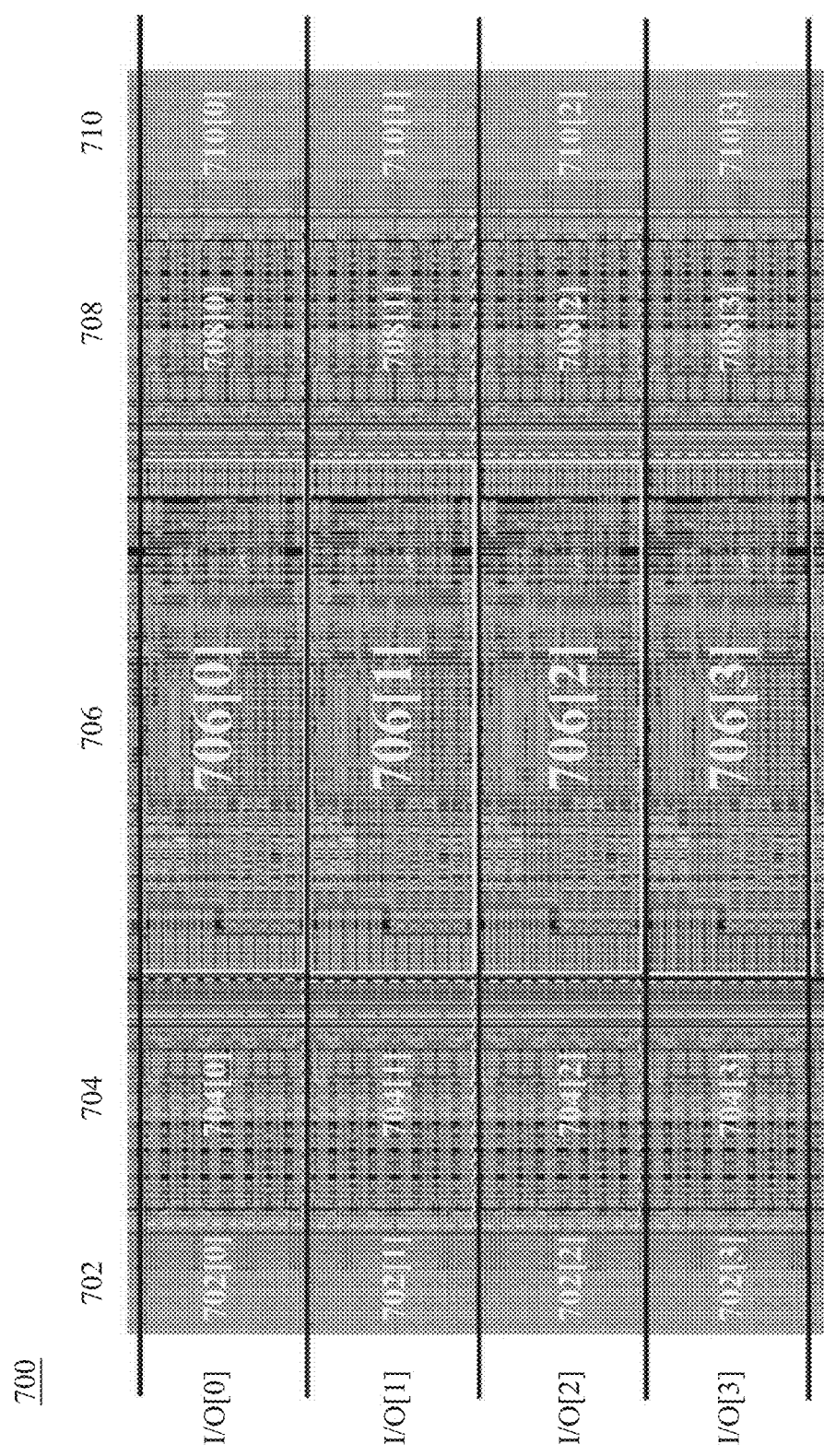
FIG. 7 illustrates an example layout of a semiconductor device including a butterfly structure of memory cells, in accordance with some embodiments.

FIG. 7 illustrates an example layout of a portion of a semiconductor device 700 that includes a number of the memory groups 200 (FIG. 2) or a number of the memory groups 300 (FIG. 3), in accordance with some embodiments. For example, the semiconductor device 700 includes first and second memory arrays 702 and 710 (e.g., each of which includes a plurality of the memory cells 100), MUX portions 704 and 708 (e.g., each of which includes a plurality of the MUXes 210, 212, or a plurality of the MUXes 310, 312, and associated bit lines or reference lines), and a sense amplifier portion 706 (e.g., which includes a plurality of the sense amplifiers 220). Further, the semiconductor device 700 includes a plurality of I/O pads, e.g., I/O[3:0], but embodiments are not limited thereto and there may be more or fewer I/O pads in the semiconductor device 700.

Each of the I/O pads may correspond to a memory group (e.g., 200, 300), which may further correspond to one or more sense amplifiers in the sense amplifier portion 706. For example, I/O pad [0] corresponds to sense amplifier 706[0]; I/O pad [1] corresponds to sense amplifier 706[1]; I/O pad [2] corresponds to sense amplifier 706[2]; and I/O pad [3] corresponds to sense amplifier 706[3]. Each of the sense amplifiers 706[0:3] can provide an output (e.g., DOUT of FIG. 2) through the corresponding I/O pad. In some embodiments, a portion of the memory array 702 and a portion of the memory array 710 may share one or more sense amplifiers through respective MUX portions 704 and 708. For example, memory array portion 702[0] and memory array portion 710[0] can share sense amplifier 706[0] through MUX portions 704[0] and 708[0], respectively; memory array portion 702[1] and memory array portion 710[1] can share sense amplifier 706[1] through MUX portions 704[1] and 708[1], respectively; memory array portion 702[2] and memory array portion 710[2] can share sense amplifier 706[2] through MUX portions 704[2] and 708[2], respectively; and memory array portion 702[3] and memory array portion 710[3] can share sense amplifier 706[3] through MUX portions 704[3] and 708[3], respectively.

Figure 8:
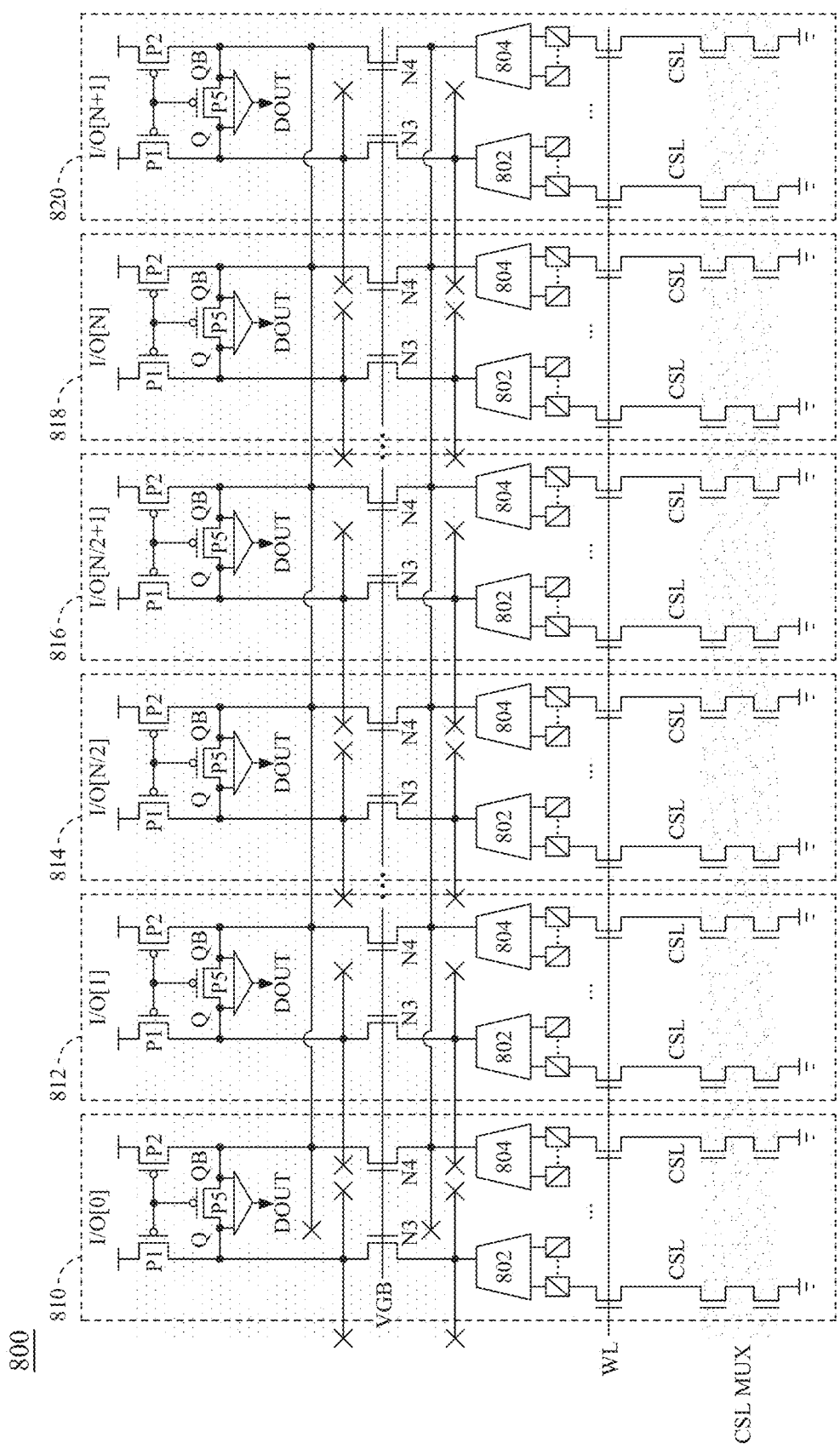
FIG. 8 illustrates an example schematic of a semiconductor device including a plurality of groups of memory cells, in accordance with some embodiments.

FIG. 8 illustrates an example schematic of a semiconductor device 800 including a plurality of memory groups 810, 812, 814, 816, 818, and 820, in accordance with some embodiments. Each of the groups 810, 812, 814, 816, 818, 820 is substantially similar to the memory group 200 (FIG. 2) or memory group 300 (FIG. 3). For example, each group 810-820 may include a MUX 802 (e.g., similar to MUX 210) and a MUX 804 (e.g., similar to MUX 212). Furthermore, each group may include two CSLs (e.g., similar to CSL 240 and 242), as discussed above. The CSLs may be controlled by a CSL MUX that includes one or more switching devices. In some embodiments, the switching devices in the CSL MUX are always on when reading from the memory cells.

Figure 9:
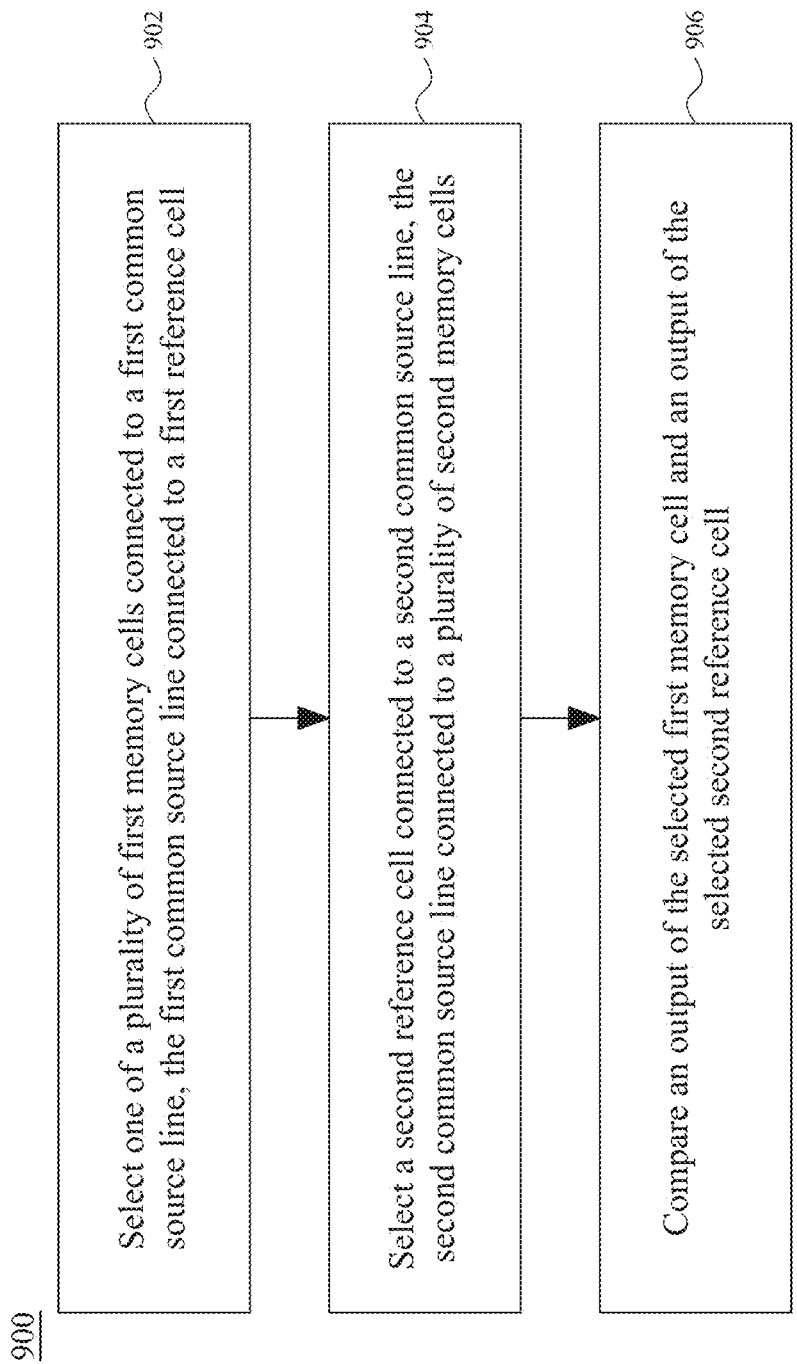
FIG. 9 illustrates a flowchart of an example method of operating a semiconductor device, in accordance with some embodiments.

FIG. 9 illustrates a flowchart of an example method 900 of operating a semiconductor device, in accordance with some embodiments. The method 900 may be used to operate a semiconductor device (e.g., semiconductor device 800) providing a high read window for reading memory cells. For example, at least some of the operations described in the method 900 use layouts and schematics described in FIGS. 1-8. It is noted that the method 900 is merely an example and is not intended to limit the present disclosure. Accordingly, it is understood that additional operations may be provided before, during, and after the method 900 of FIG. 9, and that some other operations may only be briefly described herein.

In brief overview, the method 900 starts with operation 902 of selecting one of a plurality of first memory cells connected to a first common source line, the first common source line connected to a first reference cell. The method 900 proceeds to operation 904 of selecting a second reference cell connected to a second common source line, the second common source line connected to a plurality of second memory cells. The method 900 proceeds to operation 906 of comparing an output of the selected first memory cell and an output of the selected second reference cell.

Referring to operation 902, a memory cell (e.g., memory cell 100) is selected to be read from. The memory cell may be from a first subset of memory cells (e.g., memory cells including the MTJ devices MTJ[31:16]) or a second subset of memory cells (e.g., memory cells including the MTJ devices MTJ[15:0]), each of the subsets connected to its own multiplexer (e.g., MUX 210 or 212). Each of the memory cells may include an MRAM device but embodiments are not limited thereto.

Referring to operation 904, a reference cell from a pair of reference cells (e.g., reference cell REF[1] or REF[0]) is selected. The first subset of memory cells may share a common source line with a first reference cell (e.g., reference cell REF[1]) and the second subset of memory cells may share a common source line with a second reference cell (e.g., reference cell REF[0]). The first reference cell may be selected when reading from the second subset of memory cells. The second reference cell may be selected when reading from the first subset of memory cells.

Referring to operation 906, output currents from the selected memory cell and the selected reference cell are compared to each other by a sense amplifier (e.g., sense amplifier 220). If a memory cell current is less than the reference current, this may be an indication that the selected memory cell has a high resistance. If the memory cell current is greater than the reference current, this may be an indication that the selected memory cell has a low resistance.

In one aspect of the present disclosure, a semiconductor device is disclosed. The semiconductor device includes a plurality of memory cells, a first reference cell connected to a first subset of the plurality of memory cells via a first common source line, a second reference cell connected to a second subset of the plurality of memory cells via a second common source line, and a sense amplifier configured to, when reading from a first memory cell of the first subset, receive an output from the second reference cell and an output from the first memory cell.

In another aspect of the present disclosure, a method of operating a semiconductor device is disclosed. The method includes selecting one of a plurality of first memory cells connected to a first common source line, the first common source line connected to a first reference cell, selecting a second reference cell connected to a second common source line, the second common source line connected to a plurality of second memory cells, and comparing an output of the selected first memory cell and an output of the selected second reference cell.

In yet another aspect of the present disclosure, a semiconductor device is disclosed. The semiconductor device includes a plurality of magneto-resistive storage cells, a first reference cell connected to a first subset of the plurality of magneto-resistive storage cells via a first common source line, a second reference cell connected to a second subset of the plurality of magneto-resistive storage cells via second common source line, a controller configured to, when reading from a magneto-resistive storage cell of the first subset, select the magneto-resistive storage cell and the second reference cell, and a comparator configured to compare an output current of the selected magneto-resistive storage cell and an output current of the second reference cell.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
    a plurality of memory cells;
    a first reference cell connected to a first subset of the plurality of memory cells via a first common source line;
    a second reference cell connected to a second subset of the plurality of memory cells via a second common source line;
    a controller configured to:
        select a first memory cell of the first subset to read from, and
        select the second reference cell when reading from the first memory cell of the first subset; and
    a sense amplifier configured to, when reading from the first memory cell of the first subset, compare an output from the second reference cell and an output from the first memory cell.

2. The semiconductor device of claim 1, wherein the sense amplifier is further configured to, when reading from a second memory cell of the second subset, receive an output from the first reference cell and an output from the second memory cell.

3. The semiconductor device of claim 1, wherein the first reference cell, the first subset of memory cells, the second subset of memory cells, and the second reference cell are disposed in a row of a memory array.

4. The semiconductor device of claim 1, wherein the plurality of memory cells are connected to a plurality of bit lines, the first reference cell is connected to a first reference bit line, and the second reference cell is connected to a second reference bit line, and wherein the first and second reference bit lines are disposed on opposing sides of the plurality of bit lines.

5. The semiconductor device of claim 4, further comprising a first multiplexer configured to, when reading from the first memory cell, receive outputs of the plurality of memory cells and output the output of the first memory cell to a first bit line of the plurality of bit lines.

6. The semiconductor device of claim 5, further comprising a second multiplexer configured to, when reading from the first memory cell, receive outputs of the first and second reference cells and output the output of the second reference cell to the second reference bit line of the plurality of bit lines.

7. The semiconductor device of claim 6, wherein the sense amplifier is disposed adjacent to row of the first and second reference cells and the plurality of memory cells in a second direction perpendicular to the first direction.

8. The semiconductor device of claim 5, wherein the plurality of bit lines are disposed in a metal layer that is different from a metal layer on which the first and second reference bit lines are disposed.

9. The semiconductor device of claim 1, wherein the plurality of memory cells include a plurality of magneto-resistive storage cells.

10. A method of operating a semiconductor device, comprising:
    selecting one of a plurality of first memory cells connected to a first common source line, the first common source line connected to a first reference cell;
    selecting a second reference cell connected to a second common source line, the second common source line connected to a plurality of second memory cells;
    providing a first voltage to a gate of a read word line transistor that is connected to the selected first memory cell and the second reference cell; and
    comparing an output of the selected first memory cell and an output of the selected second reference cell.

11. The method of claim 10, wherein the selecting the one of the first memory cells includes providing the first voltage to a first selector line connected to a first multiplexer to output the output of the selected first memory cell.

12. The method of claim 11, wherein the selecting the second reference cell includes providing the first voltage to a second selector line connected to a second multiplexer to output the output of the selected reference cell.

13. The method of claim 12, further comprising:
    selecting one of the plurality of second memory cells;
    selecting the first reference cell; and
    comparing an output of the selected second memory cell and an output of the first reference cell.

14. The method of claim 10, further comprising connecting the first and second common source lines to a ground terminal.

15. The method of claim 10, wherein the comparing is implemented using a sense amplifier.

16. A semiconductor device, comprising:
    a plurality of magneto-resistive storage cells;
    a first reference cell connected to a first subset of the plurality of magneto-resistive storage cells via a first common source line;
    a second reference cell connected to a second subset of the plurality of magneto-resistive storage cells via a second common source line;

a controller configured to, when reading from a magneto-resistive storage cell of the first subset, select the magneto-resistive storage cell and the second reference cell; and a comparator configured to compare an output current of the selected magneto-resistive storage cell and an output current of the second reference cell.

17. The semiconductor device of claim 16, wherein the comparator is further configured to, when reading from a second magneto-resistive storage cell of the second subset, receive an output current from the first reference cell and an output current from the second magneto-resistive storage cell.

18. The semiconductor device of claim 16, wherein the first reference cell, the first subset of magneto-resistive storage cells, the second subset of magneto-resistive storage cells, and the second reference cell are disposed in a row of a memory array.

19. The semiconductor device of claim 16, wherein the plurality of magneto-resistive storage cells are connected to a plurality of bit lines, the first reference cell is connected to a first reference bit line, and the second reference cell is connected to a second reference bit line, and wherein the first and second reference bit lines are disposed on opposing sides of the plurality of bit lines.

20. The semiconductor device of claim 16, wherein the first and second common source lines are connected to a ground terminal during the reading of the second magneto-resistive storage cell.

* * * * *